United States Patent
Kono et al.

(10) Patent No.: US 10,439,231 B2
(45) Date of Patent: Oct. 8, 2019

(54) METAL SEPARATOR FOR FUEL CELL

(71) Applicant: TOYOTA JIDOSHA KABUSHIKI KAISHA, Toyota-shi, Aichi-ken (JP)

(72) Inventors: Takashi Kono, Tajimi (JP); Masao Igarashi, Toyota (JP); Yasuki Miura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/459,407

(22) Filed: Mar. 15, 2017

(65) Prior Publication Data

US 2017/0271689 A1    Sep. 21, 2017

(30) Foreign Application Priority Data

Mar. 18, 2016    (JP) .................. 2016-055114

(51) Int. Cl.
*H01M 8/021* (2016.01)
*H01M 8/1004* (2016.01)

(52) U.S. Cl.
CPC ......... *H01M 8/021* (2013.01); *H01M 8/1004* (2013.01)

(58) Field of Classification Search
CPC ..................... H01M 8/021; H01M 8/0206
See application file for complete search history.

(56) References Cited

U.S. PATENT DOCUMENTS

| | | | |
|---|---|---|---|
| 5,413,754 A | 5/1995 | Yazawa et al. | |
| 6,472,094 B1 | 10/2002 | Nonoyama et al. | |
| 2001/0033957 A1 | 10/2001 | Nakata et al. | |
| 2006/0263666 A1 | 11/2006 | Oku et al. | |
| 2007/0099012 A1* | 5/2007 | Brady | C22C 38/24 428/457 |
| 2008/0138691 A1 | 6/2008 | Kikui | |
| 2009/0226785 A1* | 9/2009 | Kihira | B22F 1/02 429/508 |
| 2010/0129697 A1* | 5/2010 | Jeon | C22C 38/008 429/514 |
| 2010/0151357 A1 | 6/2010 | Kim et al. | |
| 2011/0159397 A1* | 6/2011 | Kaminaka | C21D 6/002 429/465 |
| 2013/0302718 A1 | 11/2013 | Ide et al. | |

FOREIGN PATENT DOCUMENTS

| | | |
|---|---|---|
| CN | 1104686 A | 7/1995 |
| CN | 101646807 A | 2/2010 |
| CN | 103314475 A | 9/2013 |

(Continued)

OTHER PUBLICATIONS

"Introduction to New Chemical Power Technology", Guoxin LI, p. 487, Shanghai Science and Technology Press, May 2007, 2 pages.

(Continued)

*Primary Examiner* — Olatunji A Godo

(74) *Attorney, Agent, or Firm* — Sughrue Mion, PLLC

(57) ABSTRACT

A metal separator for a fuel cell is disposed on each side of a membrane electrode assembly. The metal separator includes a base material containing Fe as a primary component and 10 mass % or more of Cr. The base material further contains at least any one of 0.1 to 15 mass % of Ta, 0.1 to 15 mass % of V, and 4 to 10 mass % of Sn.

3 Claims, 15 Drawing Sheets

(56) References Cited

FOREIGN PATENT DOCUMENTS

| | | |
|---|---|---|
| JP | 52-035708 A | 3/1977 |
| JP | 08-180883 A | 7/1996 |
| JP | 11-126620 A | 5/1999 |
| JP | 2001-307747 A | 11/2001 |
| JP | 2006-253089 A | 9/2006 |
| JP | 2011-026670 A | 2/2011 |
| JP | 2013117039 A | 6/2013 |
| WO | 00/03446 A1 | 1/2000 |
| WO | 2005073423 A1 | 8/2005 |
| WO | 2006/082734 A1 | 8/2006 |
| WO | 2008/130078 A1 | 10/2008 |

OTHER PUBLICATIONS

Third Office Action dated Jun. 5, 2019 issued by the State Intellectual Property Office of the People's Republic of China issued in counterpart CN 201710157496.7.

* cited by examiner

METAL SEPARATOR FOR FUEL CELL

INCORPORATION BY REFERENCE

The disclosure of Japanese Patent Application No. 2016-055114 filed on Mar. 18, 2016 including the specification, drawings and abstract is incorporated herein by reference in its entirety.

BACKGROUND

1. Technical Field

The disclosure relates to a metal separator for a fuel cell.

2. Description of Related Art

A cell of a solid polymer electrolyte fuel cell is provided with a membrane electrode assembly (MEA) constituted by an ion permeable electrolyte membrane and electrode catalyst layers (electrode catalyst) on an anode side and a cathode side with the electrolyte membrane interposed therebetween, a gas diffusion layer (GDL) for accelerating gas flow and improving current collection efficiency is provided on the outside of each electrode catalyst layer, and a metal separator is provided on the outside of the gas diffusion layer. The metal separator defines each cell. Gas or a cooling medium flows in groove channels of the metal separator. A fuel cell is formed by stacking a basic number of cells corresponding to required power.

In the fuel cell described above, hydrogen gas or the like as a fuel gas is supplied to the anode electrode, and oxygen or the air as an oxidant gas is supplied to the cathode electrode. In each electrode, gas flows in an in-plane direction via a unique gas channel layer (expanded metal, a sintered metal foam body, or the like) or the metal separator, and gas diffused in the gas diffusion layer is then guided to the electrode catalyst layer such that an electrochemical reaction is induced.

The metal separator is described in more detail. A groove channel through which the gas flows is formed in a linear shape or meandering shape on one side, and a groove channel through which the cooling medium flows is formed on the other side. For example, the oxidant gas or fuel gas flows in the in-plane direction through the groove channel in the metal separator side surface facing the membrane electrode assembly side (gas diffusion layer side), and in a procedure in which the gas flows in the in-plane direction, the oxidant gas or fuel gas is supplied to the gas diffusion layer such that the oxidant gas or fuel gas is diffused and supplied to the membrane electrode assembly via the gas diffusion layer.

In addition, the example configurations using a so-called flat type metal separator in which the gas channel layer is separated include three-layer structure in which an intermediate layer (intermediate plate or the like) having a channel formed therein is interposed between two plates, and a configuration in which an intermediate layer is formed as a metal or resin frame member and a large number of dimples or ribs that define the channel protrudes from one of the two plates to form a cooling medium channel (this structure may also be included in a metal separator having a three-layer structure). Such metal separator is a metal separator for any one of the anode side and the cathode side of a corresponding sell itself and simultaneously acts as a metal separator for the other of the anode side and the cathode side of an adjacent cell in a state where cells are stacked.

The metal separator described above comes into contact with acidic product water and is at a high potential. Accordingly, the metal separator has problems of gas leakage and cooling water leakage due to pitting corrosion or has inherent problems of deterioration in the electrolyte membrane due to metal ion elution. Therefore, in many cases, as the material of the metal separator, stainless steel with high corrosion resistance is applied.

However, in a case of further increasing the potential to improve the output of the cell and fuel efficiency (for example, an increase in potential from 0.9 V to 1.0 V or higher), there is a possibility that corrosion resistance cannot be guaranteed only by a chromium oxide film of general stainless steel due to dissolution of the chromium oxide film.

This will be described with reference to FIG. 13. FIG. 13 shows the results of experiments conducted by the inventors regarding the total amount of electricity (metal elution amount) in a case of a potential of 0.9 V and the total amount of electricity at a potential of 1.0 V for stainless steels JIS SUS 304, JIS SUS 447, and NAS 354 manufactured by Nippon Yakin Kogyo Co., Ltd. (hereinafter, sometimes denoted only by numbers).

As is apparent from FIG. 13, although metal elution is suppressed by high-alloying of the metal separator at a potential of up to 0.9 V, it is difficult to suppress metal elution even by high-alloying of the metal separator when the potential becomes 1.0 V.

This is because, when the potential becomes higher than 0.9 V, chromium or iron oxide films covering the surface of stainless steel cannot be stably formed.

For example, FIGS. 14 and 15 are correlation diagrams (Ellingham diagrams) of potential versus pH for chromium and iron, respectively, and show regions with usability.

As is apparent from FIGS. 14 and 15, in the regions with usability for both chromium and iron, regions deviating from regions in which anti-corrosion can be expected by the oxide films are present in regions with a particularly high potential.

Therefore, a measure to achieve anti-corrosion by performing a surface treatment on the metal separator is considered. However, when a surface treatment is performed, new possibilities such as scratching and generation of defects on the surface of the metal separator are incurred, and there is a possibility of degradation in the metal separator, which is not preferable.

Here, Japanese Patent Application Publication No. 8-180883 (JP 8-180883 A) relates to a separator for a fuel cell and discloses a technique in which stainless steel or a titanium alloy is applied as a metal material for easily forming a passive film on the surface of the separator.

SUMMARY

According to the separator for a fuel cell disclosed in JP 8-180883 A, by applying stainless steel or the like as the metal material, a passive film can be easily formed on the surface of the separator. However, as described above, under conditions at a high potential, chromium or iron oxide films covering the surface of stainless steel cannot be stably formed, and thus metal elution cannot be suppressed. Accordingly, sufficient corrosion resistance cannot be obtained.

The disclosure provides a metal separator for a fuel cell having excellent corrosion resistance even at a high potential.

A aspect of the present disclosure relates to a metal separator for a fuel cell is disposed on each side of a membrane electrode assembly. The metal separator includes a base material containing Fe as a primary component and 10 mass % or more of Cr. The base material further contains at least any one of 0.1 to 15 mass % of Ta, 0.1 to 15 mass % of V, and 4 to 10 mass % of Sn.

An aspect of the disclosure relates to the metal separator for a fuel cell which contains Fe as a primary component, contains 10 mass % or more of Cr, and further contains at least any one of 0.1 to 15 mass % of Ta, 0.1 to 15 mass % of V, and 4 to 10 mass % of Sn. The metal separator having this composition can effectively suppress metal elution at a high potential of about 1.0 V or higher and has excellent corrosion resistance.

In a case where Ta, V, and Sn are contained in the base material in the above-described numerical value ranges, Ta, V, and Sn are thickened in a passive film and thus strengthen the passive film. Accordingly, the corrosion resistance and pitting corrosion resistance of the metal separator can be improved at a high potential of about 1.0 V or higher.

In addition, the base material may contain 10 to 19 mass % of Cr and 0 to 13 mass % of Ni.

As metal elution, in addition to metal elution of the overall metal elution (corrosion) of the metal separator, local metal elution (pitting corrosion) due to halogen ions is also incurred. In a case of a high Cr content, favorable pitting corrosion resistance is achieved even when additive elements such as Ta, V, and Sn are absent. However, as the Cr content increases, material costs also increase. In addition, in a case where the Cr content is high and additive elements such as Ta, V, and Sn are absent, it is difficult to suppress the overall corrosion of the metal separator.

In addition, regarding the Ni content, as the Ni content increases, the metal separator achieves favorable workability. However, material costs also increase.

Therefore, as the base material contains Cr in a range of 10 to 19 mass % and 0 to 13 mass % of Ni and contains additive elements such as Ta, V, and Sn in the above-described numerical value ranges, both the overall corrosion and local pitting corrosion of the metal separator can be suppressed at as low a material cost as possible.

As can be understood from the above description, according to the metal separator for a fuel cell of the disclosure, in the base material containing Fe as a primary component and 10 mass % or more of Cr, as the base material further contains at least any one of 0.1 to 15 mass % of Ta, 0.1 to 15 mass % of V, and 4 to 10 mass % of Sn, the metal separator having excellent corrosion resistance and pitting corrosion resistance at a high potential of about 1.0 V or higher is achieved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

Figure 1:
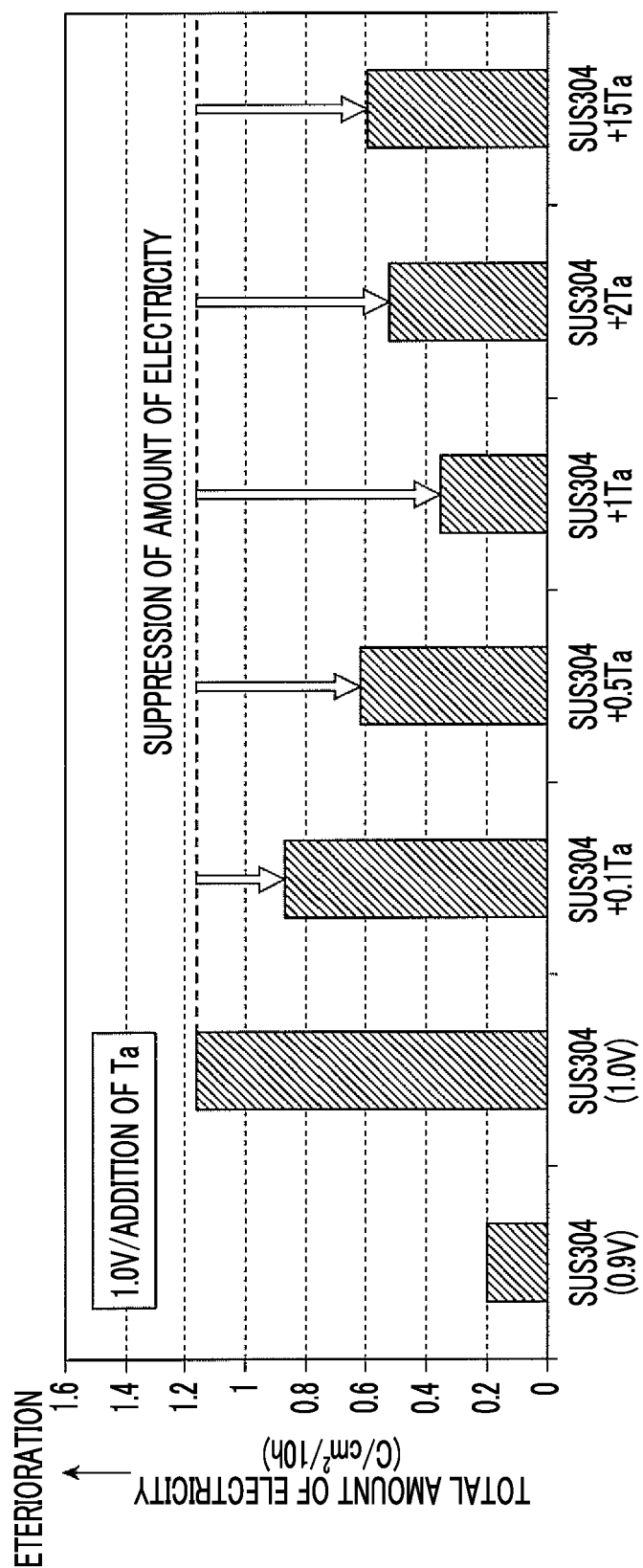
FIG. 1 is a diagram showing the results of an experiment regarding the presence or absence of addition of Ta and the metal elution amounts of metal separators at a potential of 1.0 V.

DETAILED DESCRIPTION OF EMBODIMENTS (Embodiment of Metal Separator for Fuel Cell) Hereinafter, a metal separator for a fuel cell which is an embodiment of the disclosure will be described with reference to the drawings.

A metal separator for a fuel cell is disposed on each side of a membrane electrode assembly. The metal separator includes a base material containing Fe as a primary component and 10 mass % or more of Cr. The base material further contains at least any one of 0.1 to 15 mass % of Ta, 0.1 to 15 mass % of V, and 4 to 10 mass % of Sn. The two metal separators sandwich the membrane electrode assembly.

Here, the term "contains at least any one of" has a meaning including all of forms in which any of 0.1 to 15 mass % of Ta, 0.1 to 15 mass % of V, and 4 to 10 mass % of Sn is included, a form in which any two of 0.1 to 15 mass % of Ta, 0.1 to 15 mass % of V, and 4 to 10 mass % of Sn are included, and a form in which any three of 0.1 to 15 mass % of Ta, 0.1 to 15 mass % of V, and 4 to 10 mass % of Sn are included.

Supplementally, an electrolyte membrane included in the membrane electrode assembly is a fluorinated ion exchange membrane having a sulfonic acid group or a carbonyl group, a non-fluorinated polymer such as a substituted phenylene oxide, a sulfonated poly(aryl ether ketone), a sulfonated poly(aryl ether sulfone), or a sulfonated phenylene sulfide, or the like, and an electrode catalyst layer is made of a porous material in which a catalyst made of Pt or an alloy thereof is supported on carbon or the like.

Although not illustrated, as examples of the metal separator, as well as a single-layer structure provided with a groove channel through which a fuel gas or oxidant gas flows, there is three-layer structure in which an intermediate layer (intermediate plate or the like) having a channel formed therein is interposed between two plates.

The base material of the metal separator contains Fe as a primary component and 10 mass % or more of Cr. More specifically, it is preferable that 10 to 19 mass % of Cr and 0 to 13 mass % of Ni are contained.

From the results of various experiments conducted by the inventors, which will be described below, it is known that as the base material of the metal separator contains at least any one of 0.1 to 15 mass % of Ta, 0.1 to 15 mass % of V, and 4 to 10 mass % of Sn, a metal separator in which both the corrosion resistance of the entire metal separator and the local pitting corrosion resistance of the metal separator are excellent at a high potential of about 1.0 V or higher.

((First) Experiment regarding Corrosion Resistance and Results) The inventors conducted an experiment regarding the presence or absence of addition of Ta, the presence or absence of addition of V, and the presence or absence of addition of Sn, and the metal elution amount of a metal separator (the corrosion resistance of the entire metal separator) at a high potential. Here, the metal separator that was used was made of SUS 304, and the base material thereof contained Fe as a primary component, 19 mass % of Cr, and 8 mass % of Ni, and further contain a predetermined amount of any one of Ta, V, and Sn. Hereinafter, numerical values in front of the element symbols mean mass %. Here, 0.9 V, 1.0 V, and 1.1 V in parentheses in the figures, that is, (0.9 V), (1.0 V), and (1.1 V) and 1.0 V, 1.1 V, and 0.9 V in rectangular frames represent voltage.

As an experiment method, a 700 ml solution was produced by adding halogen ions to a sulfuric acid at a pH of 3.0±0.1, and the solution was heated to 80° C., each specimen was immersed therein, and the total amount of electricity (metal elution amount) when a predetermined potential was applied to the specimen for 10 hours was measured by POTENTIOSTAT HZ-5000 manufactured by HOKUTO DENKO CORPORATION.

Here, regarding the specimens and applied potentials, the total amounts of electricity (evaluation area 1 cm$^2$) in a case in which 0.9 V and 1.0 V ($V_{vs}$SHE: standard hydrogen electrode potential) are applied to 19Cr-8Ni stainless steel 304, and each of cases in which a potential of 1.0 V is applied to a specimen containing 0.1 mass % of Ta in 19Cr-8Ni stainless steel 304, a specimen containing 0.5 mass % of Ta, a specimen containing 1 mass % of Ta, a specimen containing 2 mass % of Ta, and a specimen containing 15 mass % of Ta were measured. The results are shown in FIG. 1.

Figure 2:
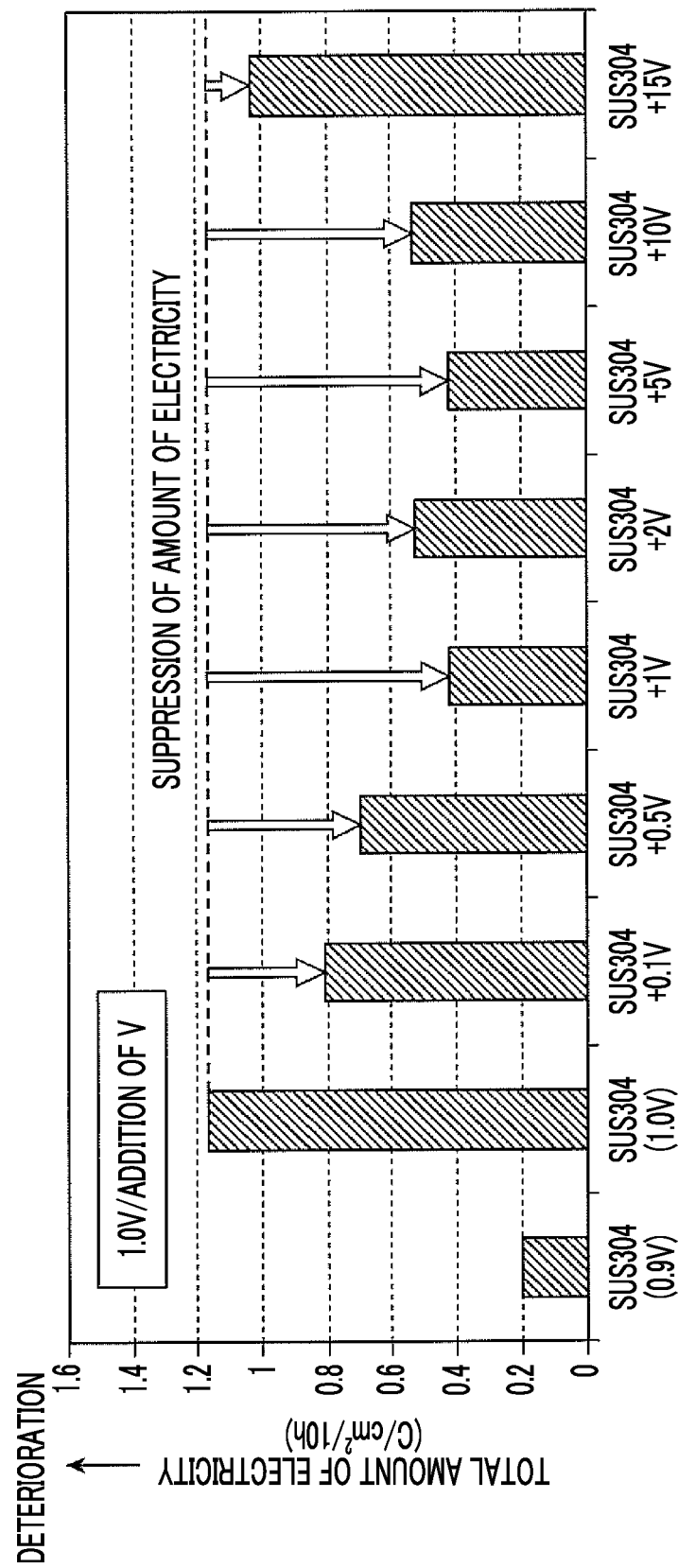
FIG. 2 is a diagram showing the results of an experiment regarding the presence or absence of addition of V and the metal elution amounts of metal separators at a potential of 1.0 V.

In addition, a potential of 1.0 V was applied to each of a specimen containing 0.1 mass % of V in 19Cr-8Ni stainless steel 304, a specimen containing 0.5 mass % of V, a specimen containing 1 mass % of V, a specimen containing 2 mass % of V, a specimen containing 5 mass % of V, a specimen containing 10 mass % of V, and a specimen containing 15 mass % of V, and the total amount of electricity of each case was measured. The results are shown in FIG. 2.

Figure 3:
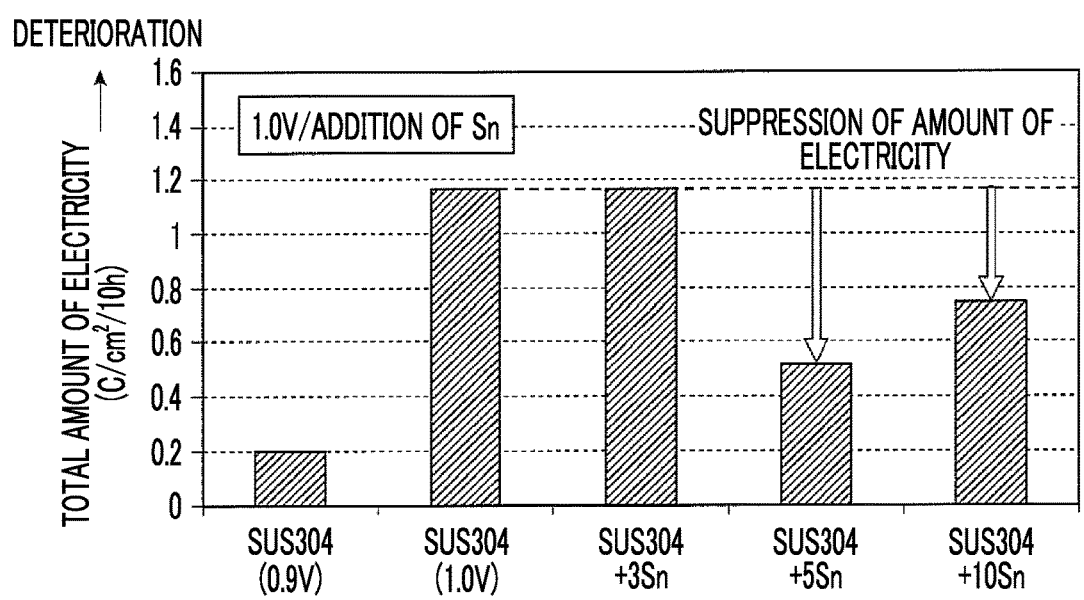
FIG. 3 is a diagram showing the results of an experiment regarding the presence or absence of addition of Sn and the metal elution amounts of metal separators at a potential of 1.0 V.

Furthermore, a potential of 1.0 V was applied to each of a specimen containing 3 mass % of Sn in 19Cr-8Ni stainless steel 304, a specimen containing 5 mass % of Sn, and a specimen containing 10 mass % of Sn, and the total amount of electricity of each case was measured. The results of the experiment are shown in FIG. 3.

From FIG. 1, it is demonstrated that when 0.1 to 15 mass % of Ta is contained in the metal separator, the total amount of electricity (metal elution amount) at a potential of 1.0 V can be decreased to about 30% to 50% of the total amount of electricity of a metal separator with no Ta contained.

From the results of the experiment, it can be seen that the base material of the metal separator may contain 0.1 to 15 mass % of Ta.

In addition, from FIG. 2, it is demonstrated that when 0.1 to 15 mass % of V is contained, the total amount of electricity (metal elution amount) at a potential of 1.0 V can be decreased to about 30% to 90% of the total amount of electricity of a metal separator with no V contained.

From the results of the experiment, it can be seen that the base material of the metal separator may contain 0.1 to 15 mass % of V.

Furthermore, from FIG. 3, it is demonstrated that when 4 to 10 mass % of Sn is contained, the total amount of electricity (metal elution amount) at a potential of 1.0 V can be decreased to about 40% to 60% of the total amount of electricity of a metal separator with no Sn contained.

In addition, from FIG. 3, it can be seen that since 5 mass % of Sn can achieve sufficient effects although 3 mass % of Sn has no effect, the base material of the metal separator may contain 4 to 10 mass % of Sn.

Figure 4:
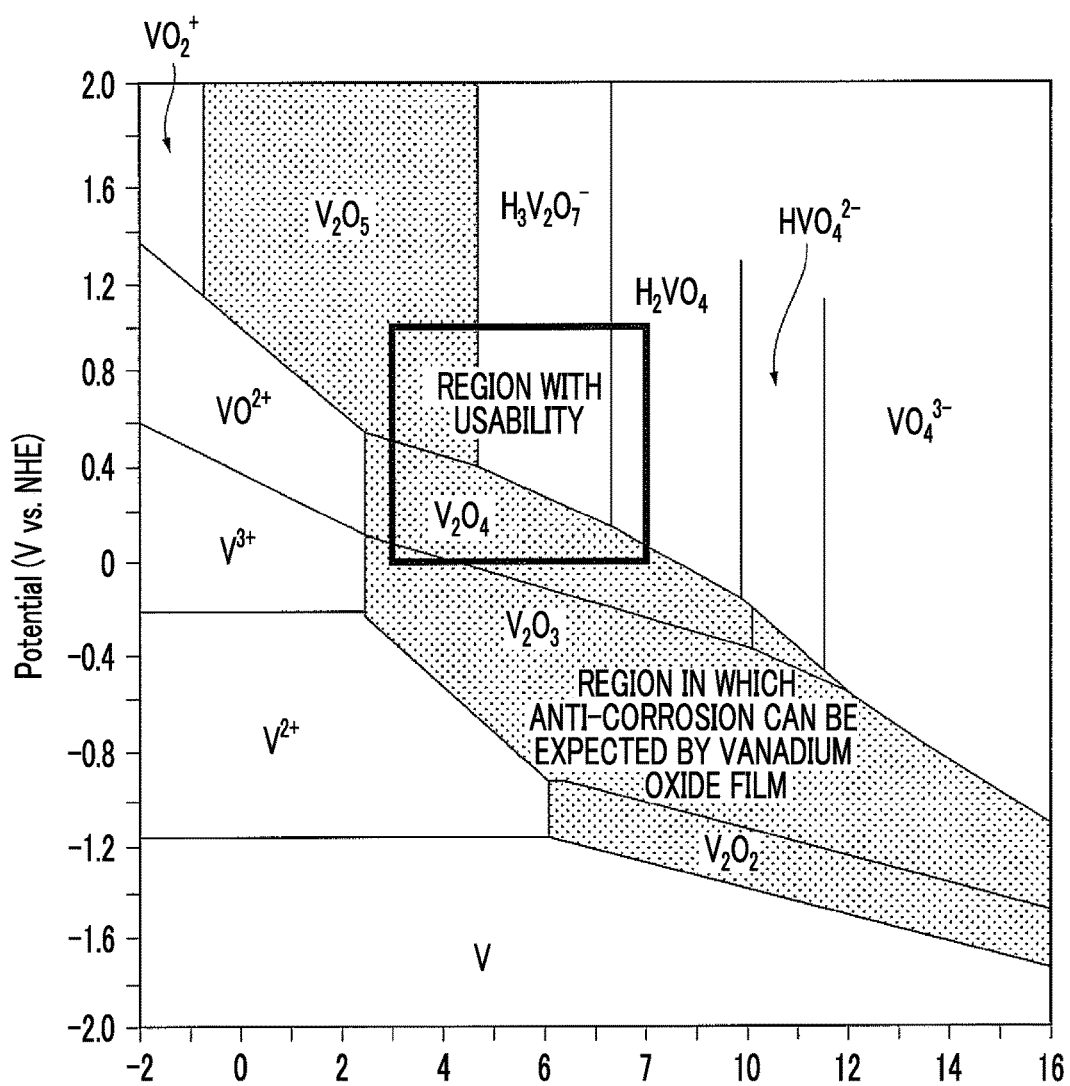
FIG. 4 is a pH-potential diagram (Ellingham diagram) for a V oxide film.
Figure 5:
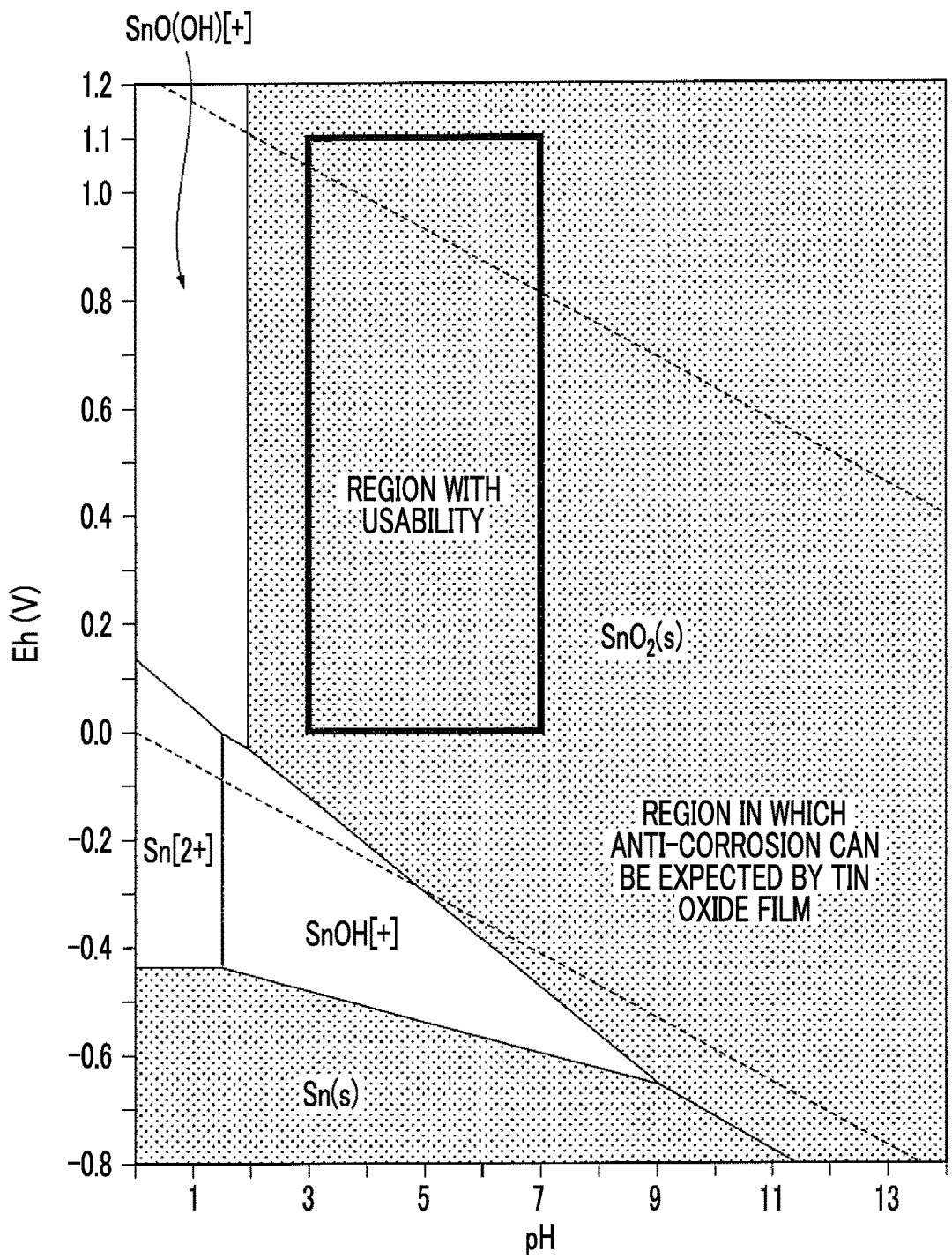
FIG. 5 is a pH-potential diagram (Ellingham diagram) for a Sn oxide film.

FIGS. 4 and 5 show pH-potential diagrams (Ellingham diagrams) for a V oxide film and a Sn oxide film, respectively.

From FIG. 4, it is demonstrated that a region in which anti-corrosion can be expected by the vanadium oxide film containing 0.1 to 15 mass % of V can cover a region with usability including a region with a high potential of about 1.1 V in a highly acidic region with a pH of 2 to 5.

On the other hand, it is demonstrated that a region in which anti-corrosion can be expected by the tin oxide film containing 5 to 10 mass % of Sn can completely cover a region with usability including a region with a high potential of about 1.1 V in an acidic region with a pH of 2 to 7.

From the results of the experiment, the base material of the metal separator was set to contain at least any one of 0.1 to 15 mass % of Ta, 0.1 to 15 mass % of V, and 4 to 10 mass % of Sn.

((Second) Experiment Regarding Corrosion Resistance and Results)

Next, an experiment for verifying the total amount of electricity at a potential of 1.0 V was conducted on a specimen containing only V and a specimen containing all of Ta, Sn, and V using 10Cr-0Ni SUS 409. In addition, an experiment method is the same as that of the (first) experiment. The results of the experiment conducted on the specimen containing only V are shown in FIG. 6A, and the results of the experiment conducted on the specimen containing all of Sn, Ta, and V are shown in FIG. 6B.

Figure 6A:
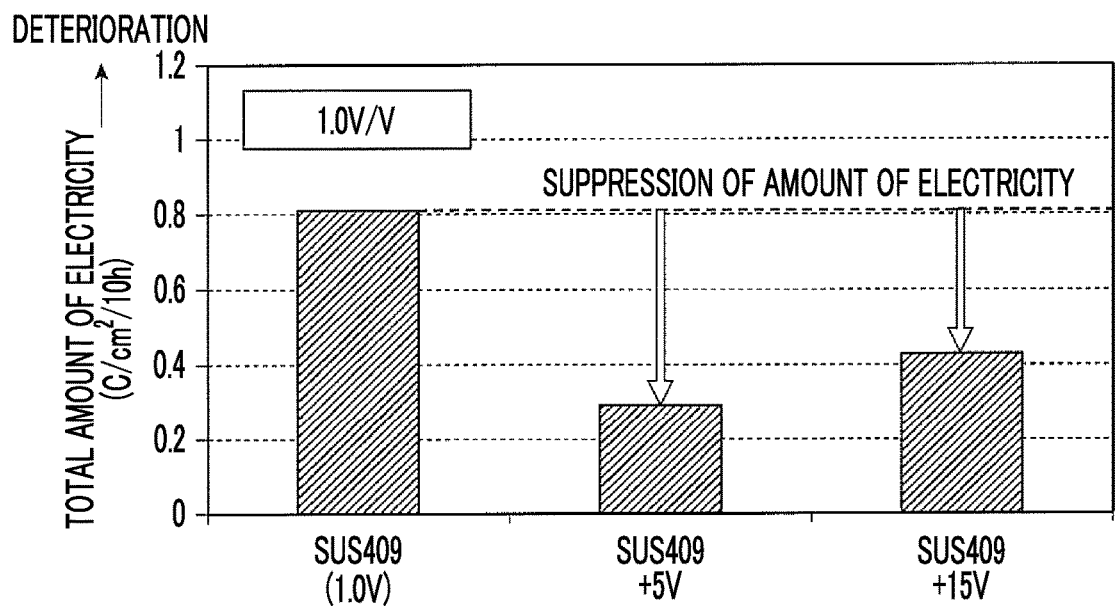
FIG. 6A is a diagram showing the results of an experiment regarding the presence or absence of addition of V and the metal elution amounts of metal separators at a potential of 1.0 V.

From FIG. 6A, it can be seen that metal separators containing 5 mass % of V and 15 mass % of V even in 10Cr-0Ni SUS 409 have an effect of suppressing the amount of electricity.

Figure 6B:
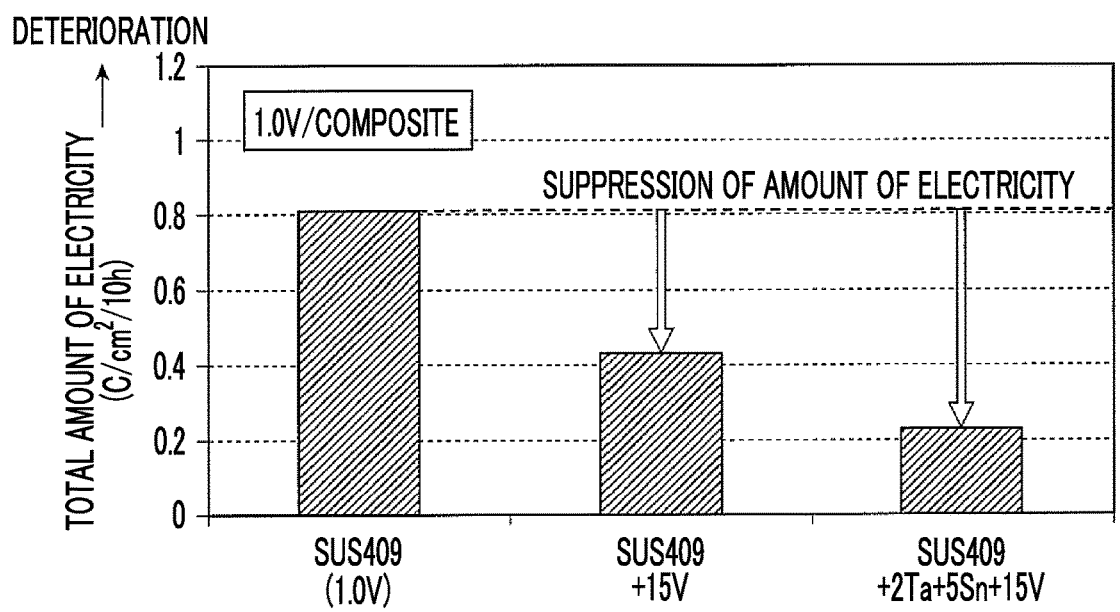
FIG. 6B is a diagram showing the results of an experiment regarding the presence or absence of addition of V, Ta, and Sn and the metal elution amounts of metal separators at a potential of 1.0 V.

In addition, from FIG. 6B, it can be seen that a metal separator containing 2 mass % of Ta, 5 mass % of Sn, and 15 mass % of V has a higher effect of suppressing the amount of electricity than a metal separator containing 15 mass % of V, and it is demonstrated that a metal separator containing three of Ta, Sn, and V exhibits a high effect of suppressing the amount of electricity.

((Third) Experiment regarding Corrosion Resistance and Results) Next, even in a case of a base material with a high Ni content in which 5 mass % of Ni is added to 19Cr-8Ni SUS 304 to achieve 19Cr-13Ni, the presence or absence of the effect of suppressing the amount of electricity by Ta, Sn, and V was verified. The results of the experiment are shown in FIG. 7.

Figure 7:
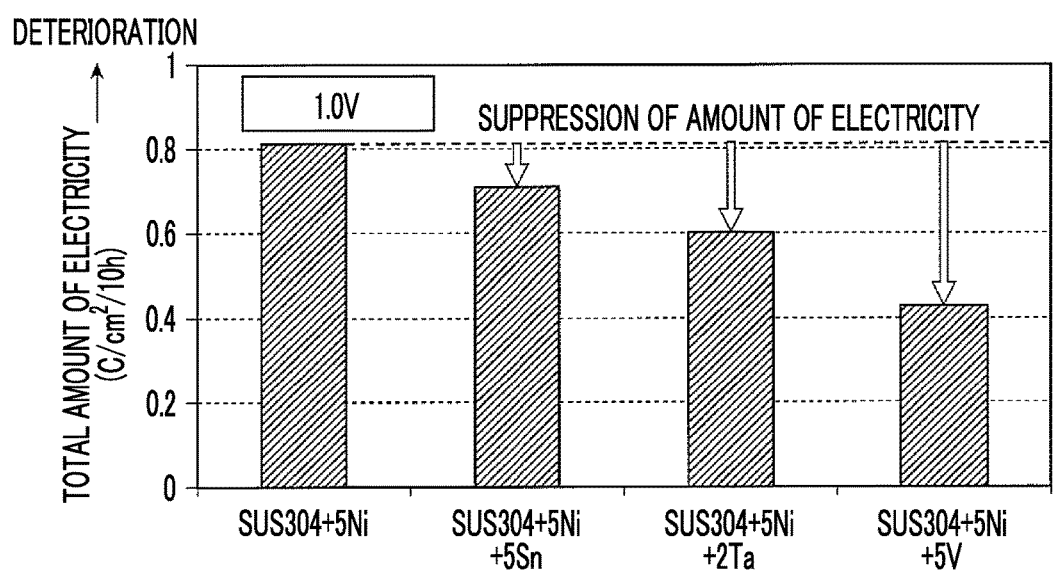
FIG. 7 is a diagram showing the results of an experiment regarding the presence or absence of addition of Ta, V, and Sn and the metal elution amounts of metal separators at a potential of 1.0 V.

From FIG. 7, it can be seen that regarding a specimen with a high Ni content, even in a case where any of Ta, Sn, and V is contained, the effect of suppressing the amount of electricity is exhibited at a high applied potential of 1.0 V.

Figure 8A:
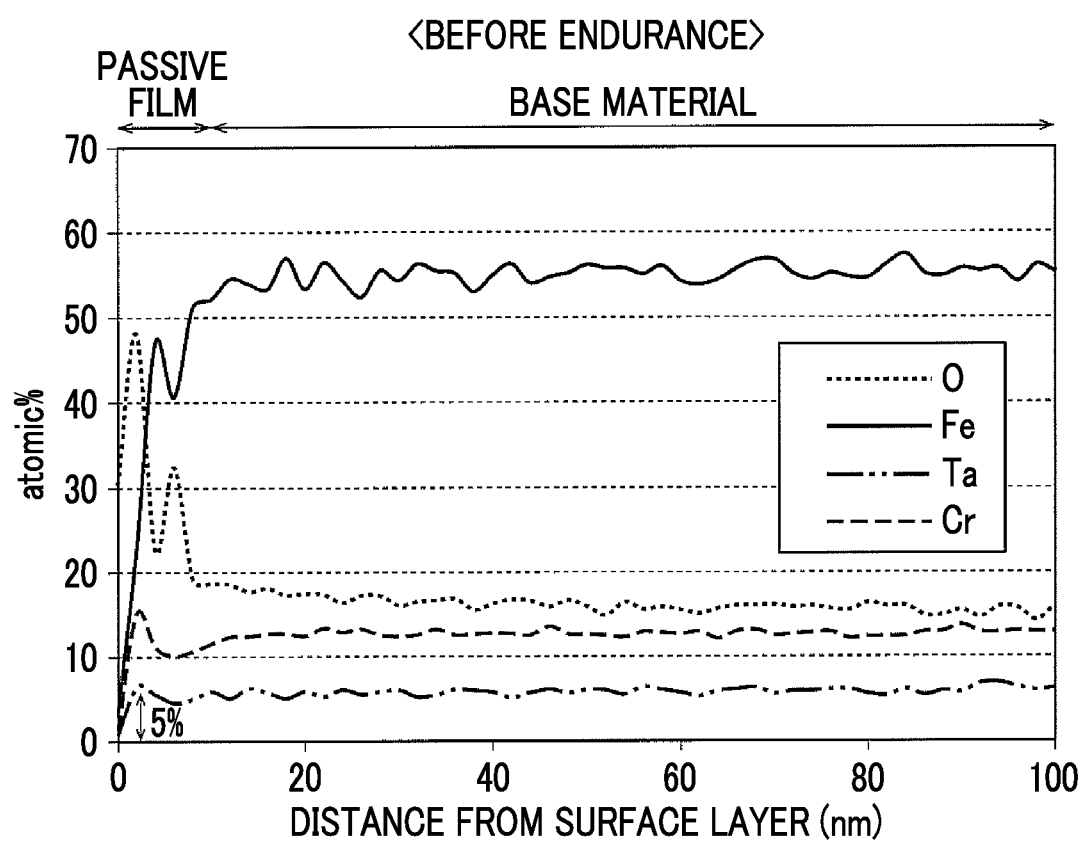
FIG. 8A is a diagram showing the results of composition analysis of a passive film before an endurance test using XPS.

(Composition Analysis Test of Passive Film Before and After Endurance Test) The inventors conducted composition analysis of a passive film before and after an endurance test on the metal separator containing 5Ta in 19Cr-8Ni stainless steel 304 using X-ray photoelectron spectroscopy (XPS). FIG. 8A is a diagram showing the results of the composition analysis of the passive film before the endurance test, and FIG. 8B is a diagram showing the results of the composition analysis of the passive film after the endurance test.

A range in which the oxygen content in the composition is 30 atomic % or more is referred to as the passive film, and a range of less than 30 atomic % is referred to as the base material.

Figure 8B:
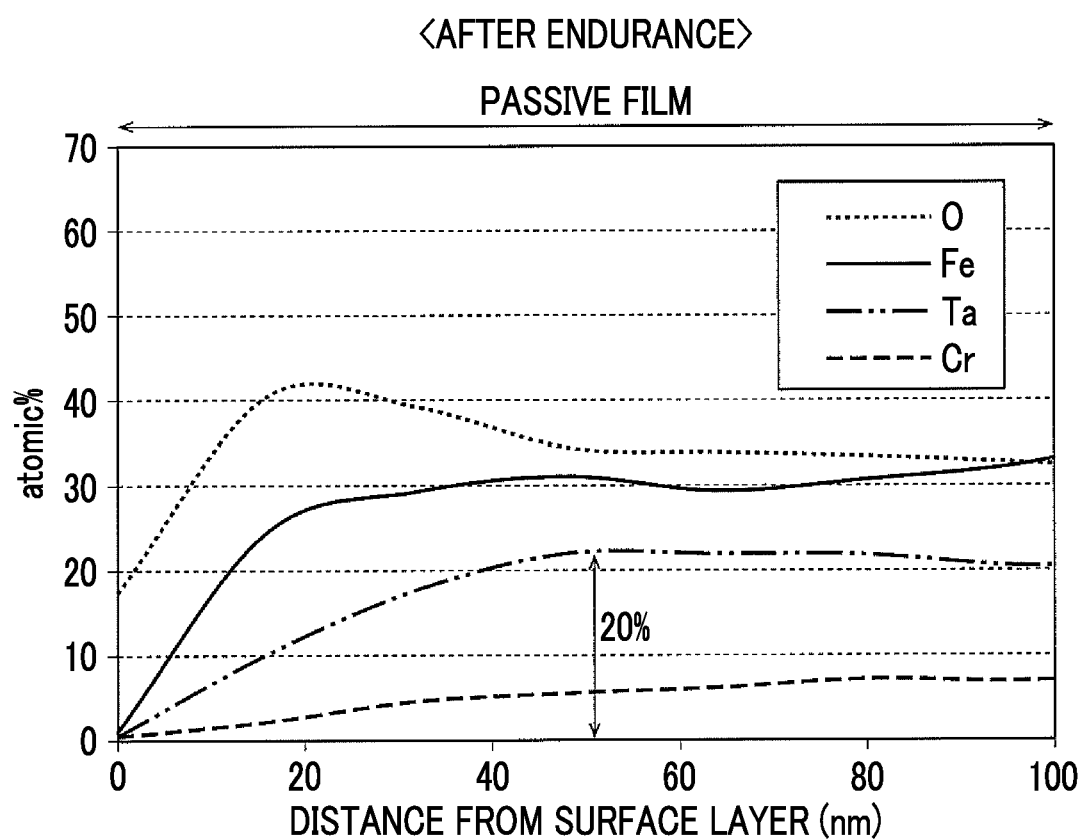
FIG. 8B is a diagram showing the results of composition analysis of the passive film after the endurance test using XPS.

While it can be seen from FIG. 8A that a region of about 5 nm from the surface layer is the passive film before the endurance test, it can be seen from FIG. 8B that the entire region of 100 nm from the surface layer is the passive film after the endurance test, and furthermore, Ta is thickened in the passive film.

The total amount of electricity when a potential of 1.1 V is applied to the metal separator before and after the endurance test for 10 hours was measured. The results of the measurement are shown in FIGS. 9 to 11.

Figure 9:
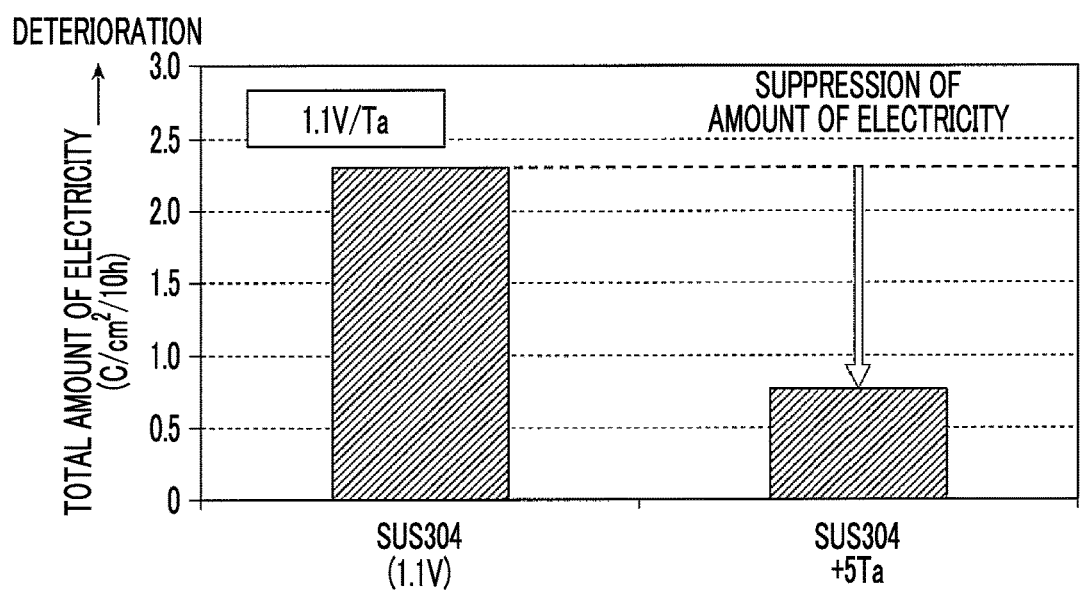
FIG. 9 is a diagram showing the results of an experiment regarding the presence or absence of addition of Ta and the metal elution amounts of metal separators at a potential of 1.1 V.

From FIG. 9, it can be seen that while the total amount of electricity of the metal separator before the endurance test (the metal separator before Ta is thickened) is 2.3 C/cm$^2$/10 h, the total amount of electricity of the metal separator after the endurance test (the metal separator after Ta is thickened) is suppressed to about 0.76 C/cm$^2$/10 h, which is about 30%.

Figure 10:
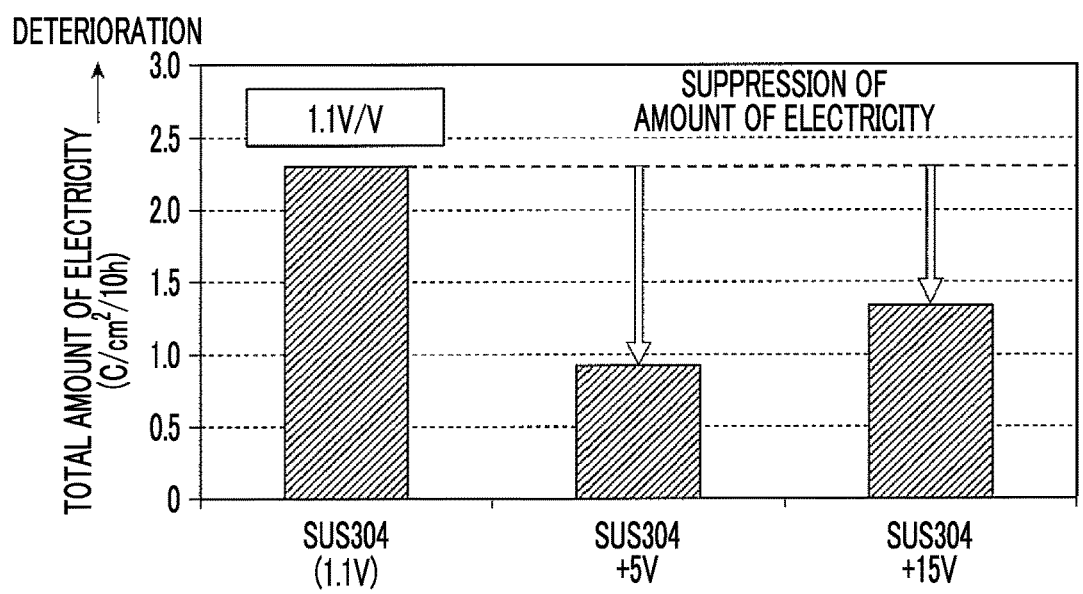
FIG. 10 is a diagram showing the results of an experiment regarding the presence or absence of addition of V and the metal elution amounts of metal separators at a potential of 1.1 V.

In addition, from FIG. 10, it can be seen that as a result of conducting the same test on specimens containing 5V and 15V in stainless steel 304 in the same manner, the total amounts of electricity are suppressed to 0.92 and 1.34 C/cm$^2$/10 h, respectively.

Figure 11:
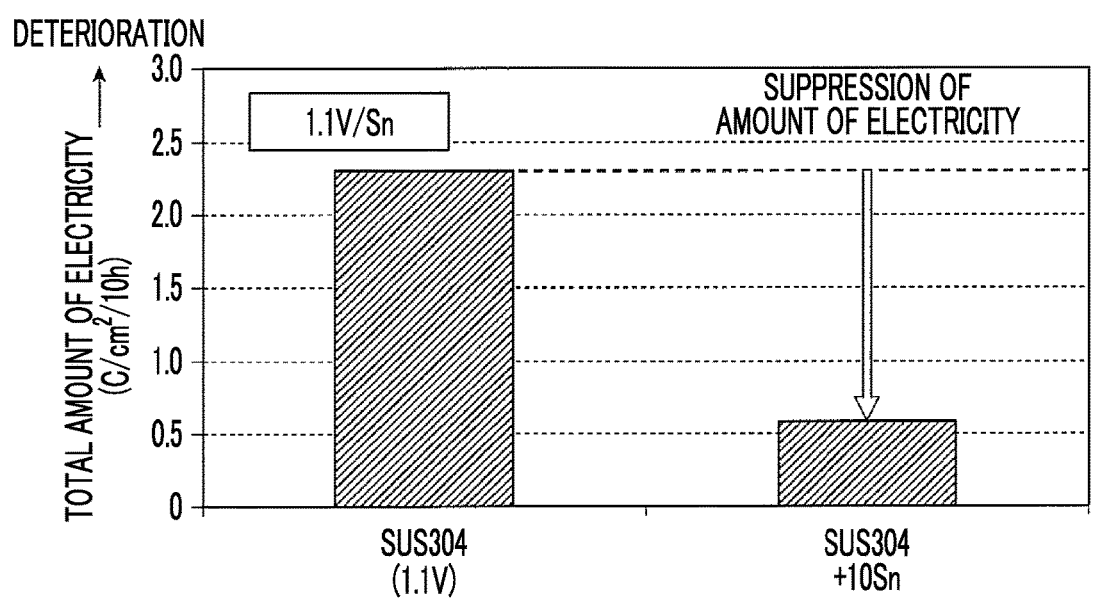
FIG. 11 is a diagram showing the results of an experiment regarding the presence or absence of addition of Sn and the metal elution amounts of metal separators at a potential of 1.1 V.

Furthermore, from FIG. 11, it can be seen that as a result of conducting the same test on a specimen containing 10 Sn in stainless steel 304 in the same manner, the total amount of electricity is suppressed to 0.58 C/cm$^2$/10 h.

(Experiment for Verifying Pitting Corrosion Resistance and Results)

Next, the inventors conducted an experiment for verifying the presence or absence of improvement in the pitting corrosion resistance of the metal separator when V or Ta is contained in the base material.

Figure 12A:
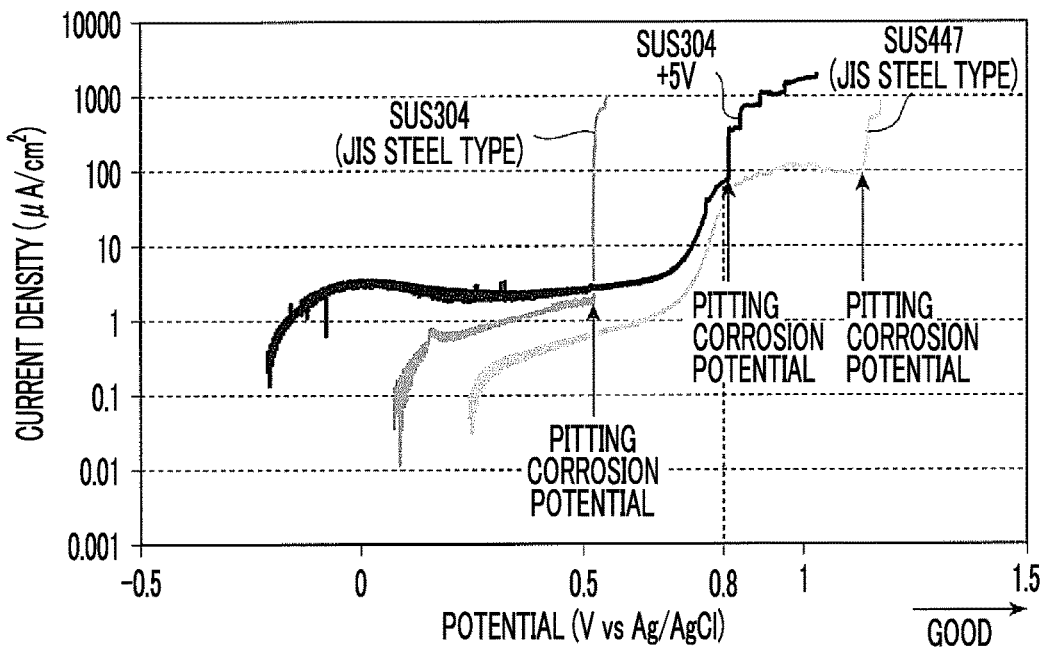
FIG. 12A is a diagram showing the results of an experiment regarding the presence or absence of addition of V and pitting corrosion potentials.

As an experiment method, a solution at a pH of 3.0±0.1 was produced by adding a sulfuric acid to water, halogen ions were added to the solution, the solution was heated to 80° C., each specimen was immersed in the solution, and a potential at which the current density sharply increased when the potential was gradually increased was measured as a pitting corrosion potential. FIG. 12A is a diagram showing the results of the experiment regarding the presence or absence of addition of V and pitting corrosion potentials, and FIG. 12B is a diagram showing the results of the experiment regarding the presence or absence of addition of Ta and the presence or absence of addition of V and pitting corrosion potentials.

From FIG. 12A, it can be seen that while the pitting corrosion potential of 19Cr-8Ni SUS 304 is about 0.5 V, the pitting corrosion potential of the metal separator containing 5 mass % of V is increased to about 0.8 V. In addition, FIG. 12A also shows the pitting corrosion potential (about 1.14 V) of 30Cr SUS 447 for reference.

Figure 12B:
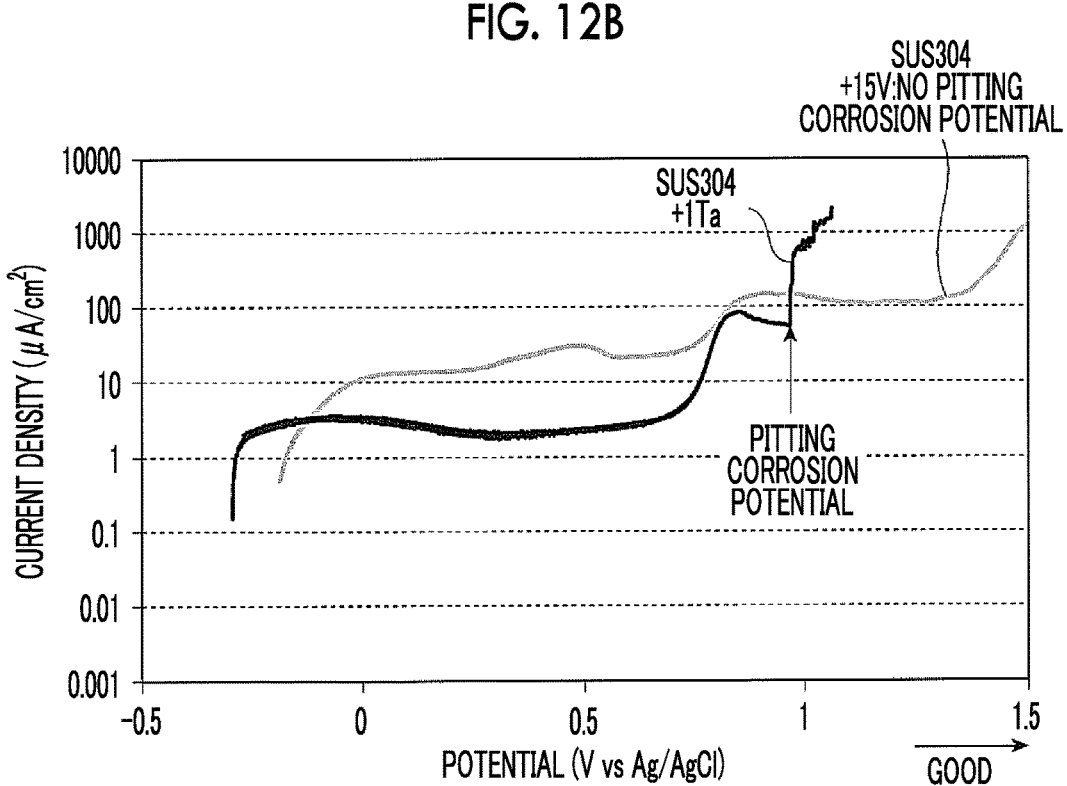
FIG. 12B is a diagram showing the results of an experiment regarding the presence or absence of addition of Ta and the presence or absence of addition of V and pitting corrosion potentials.
Figure 13:
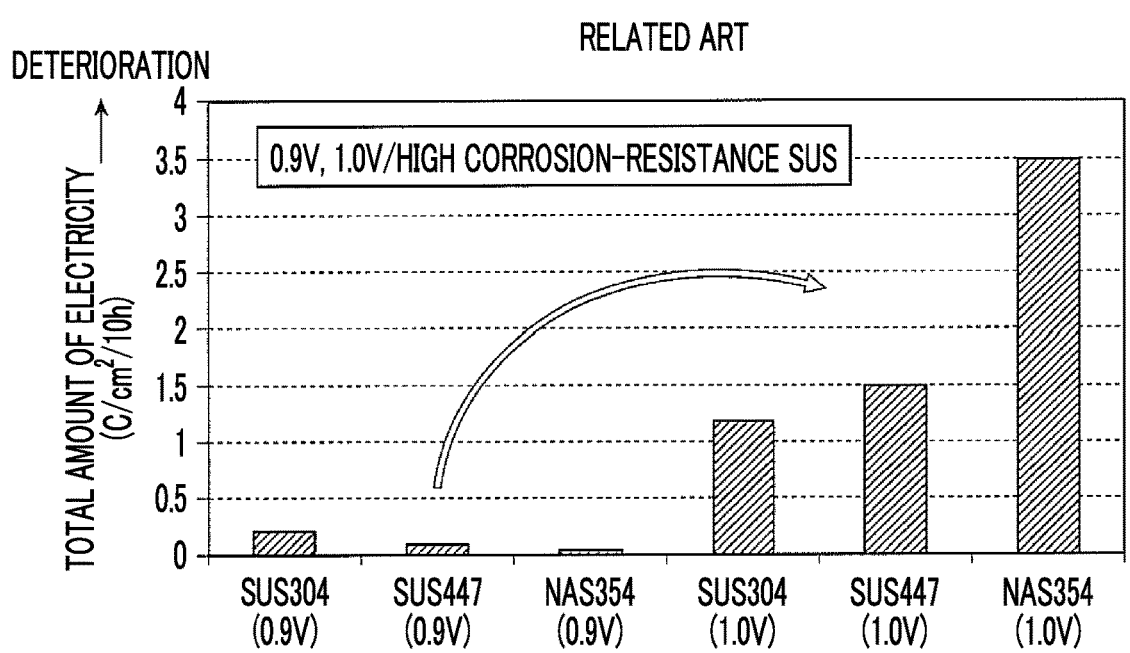
FIG. 13 is a diagram showing the results of an experiment regarding the total amount of electricity (metal elution amount) in a case where stainless steels 304, 447, and 354 are at a potential of 0.9 V and the total amount of electricity at a potential of 1.0 V.
Figure 14:
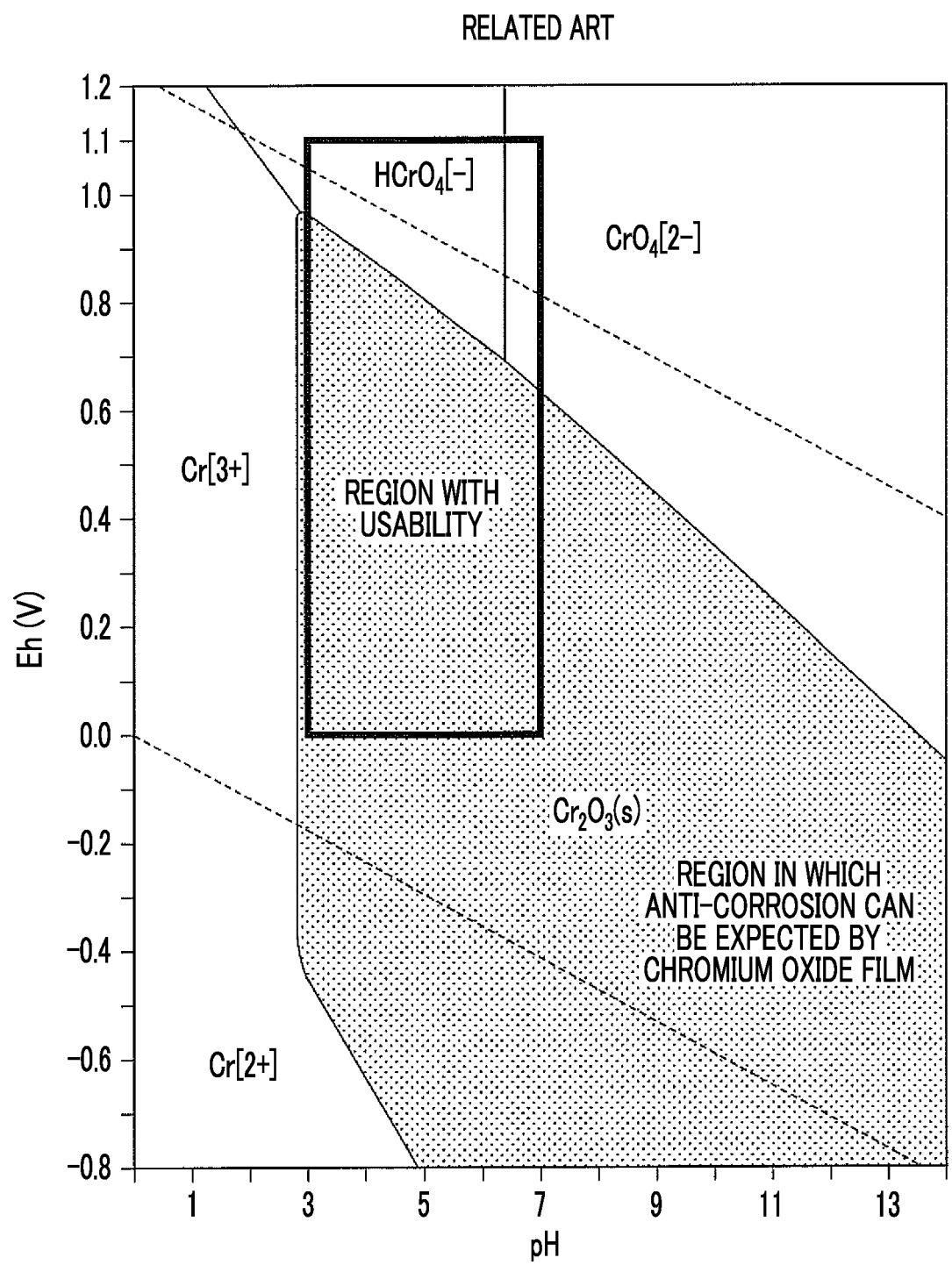
FIG. 14 is a pH-potential diagram (Ellingham diagram) for a Cr oxide film.
Figure 15:
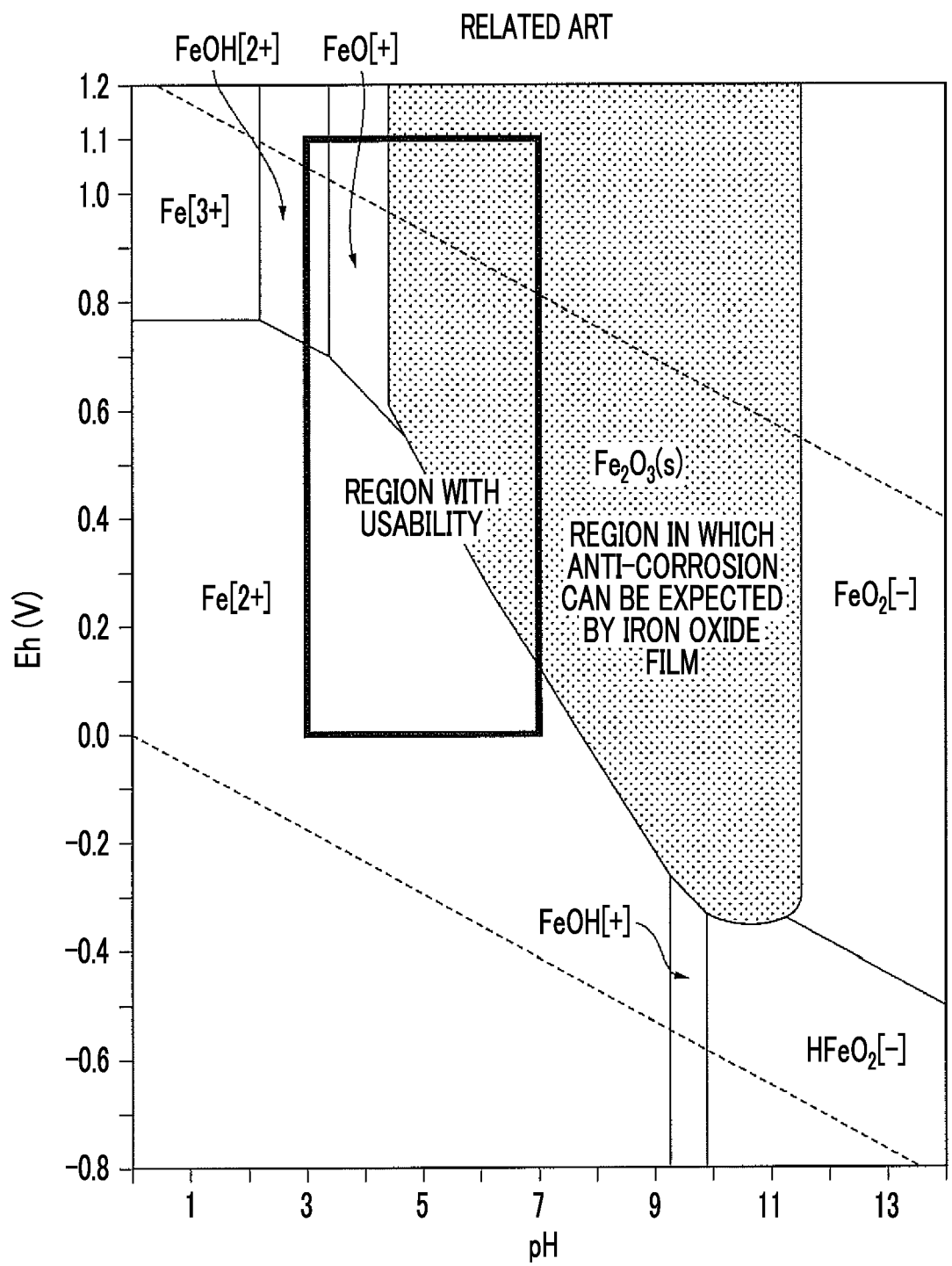
FIG. 15 is a pH-potential diagram (Ellingham diagram) for a Fe oxide film.

On the other hand, from FIG. 12B, it can be seen that the pitting corrosion potential of the metal separator containing 1 mass % of Ta is increased to about 1.0 V, and the metal separator containing 15 mass % of V has no pitting corrosion potential, that is, pitting corrosion does not occur. The above results of the experiment are shown in Table 1 as follows.

TABLE 1

| Sample name | Chemical components | | | | | | Amount of electricity (C/cm$^2$/10 h) | | | Pitting corrosion potential |
|---|---|---|---|---|---|---|---|---|---|---|
| | Cr | Ni | Mo | Sn | Ta | V | 0.9 V$_{vsSHE}$ | 1.0 V$_{vsSHE}$ | 1.1 V$_{vsSHE}$ | (V$_{vsAg/AgCl}$) |
| SUS304 | 19 | 8 | 0 | 0 | 0 | 0 | 0.20 | 1.17 | 2.29 | 0.52 |
| SUS304 + 5Ni | 19 | 13 | 0 | 0 | 0 | 0 | 0.07 | 0.81 | 3.55 | — |
| NAS354N | 23 | 35 | 7.5 | 0 | 0 | 0 | 0.03 | 3.48 | — | 1.40 over |
| SUS409L | 10 | 0 | 0 | 0 | 0 | 0 | — | 0.81 | — | — |
| SUS447J1L | 30 | 0 | 2 | 0 | 0 | 0 | 0.09 | 1.49 | 1.47 | 1.14 |
| No. 1 | 19 | 8 | 0 | 3 | 0 | 0 | — | 1.18 | — | — |
| No. 2 | 19 | 8 | 0 | 5 | 0 | 0 | — | 0.52 | — | — |
| No. 3 | 19 | 8 | 0 | 10 | 0 | 0 | — | 0.75 | 0.58 | — |
| No. 4 | 19 | 8 | 0 | 0 | 1 | 0 | 0.04 | 0.36 | — | 0.97 |
| No. 5 | 19 | 8 | 0 | 0 | 2 | 0 | — | 0.53 | — | — |
| No. 6 | 19 | 8 | 0 | 0 | 5 | 0 | — | — | 0.76 | — |
| No. 7 | 19 | 8 | 0 | 0 | 15 | 0 | 0.02 | 0.60 | — | 0.91 |
| No. 8 | 19 | 8 | 0 | 0 | 0 | 1 | 0.13 | 0.43 | — | 0.62 |
| No. 9 | 19 | 8 | 0 | 0 | 0 | 2 | — | 0.53 | — | — |

TABLE 1-continued

| Sample name | Chemical components | | | | | | Amount of electricity (C/cm$^2$/10 h) | | | Pitting corrosion potential ($V_{vsAg/AgCl}$) |
|---|---|---|---|---|---|---|---|---|---|---|
| | Cr | Ni | Mo | Sn | Ta | V | 0.9 $V_{vsSHE}$ | 1.0 $V_{vsSHE}$ | 1.1 $V_{vsSHE}$ | |
| No. 10 | 19 | 8 | 0 | 0 | 0 | 5 | — | — | 0.92 | 0.83 |
| No. 11 | 19 | 8 | 0 | 0 | 0 | 10 | — | 0.54 | — | — |
| No. 12 | 19 | 8 | 0 | 0 | 0 | 15 | 0.07 | 1.04 | 1.34 | 1.40 over |
| No. 13 | 10 | 0 | 0 | 0 | 0 | 5 | — | 0.29 | — | 0.46 |
| No. 14 | 10 | 0 | 0 | 0 | 0 | 15 | — | 0.43 | — | — |
| No. 15 | 10 | 0 | 0 | 0 | 0 | 20 | — | — | 1.40 | — |
| No. 16 | 10 | 0 | 0 | 5 | 2 | 15 | — | 0.23 | — | 0.69 |
| No. 17 | 19 | 13 | 0 | 5 | 0 | 0 | — | 0.71 | — | — |
| No. 18 | 19 | 13 | 0 | 0 | 2 | 0 | — | 0.60 | — | — |
| No. 19 | 19 | 13 | 0 | 0 | 0 | 5 | — | 0.43 | — | — |

From various experiments described above, it is demonstrated that as the base material of the metal separator contains at least any one of 0.1 to 15 mass % of Ta, 0.1 to 15 mass % of V, and 4 to 10 mass % of Sn, an excellent effect of suppressing the amount of electricity is exhibited, the corrosion resistance of the entire metal separator is improved, and the metal separator with excellent pitting corrosion resistance is achieved.

While the embodiment of the disclosure has been described in detail using the drawings, specific configurations are not limited to the embodiment, and changes in design without departing from the gist of the disclosure and the like are also included in the disclosure.

What is claimed is:

1. A metal separator for a fuel cell, the metal separator being disposed on each side of a membrane electrode assembly, the metal separator comprising:
   a base material containing Fe as a primary component and 10 mass % or more of Cr,
   wherein the base material further contains 4 to 10 mass % of Sn.

2. The metal separator according to claim 1, wherein the base material contains 10 to 19 mass % of Cr and 0 to 13 mass % of Ni.

3. The metal separator according to claim 1, wherein the base material further contains at least one of 0.1 to 15 mass % Ta and 0.1 to 15 mass % V.

* * * * *